US012630386B2

(12) United States Patent
Gao et al.

(10) Patent No.: US 12,630,386 B2
(45) Date of Patent: May 19, 2026

(54) ELECTRODE PLATE WRINKLING DETECTION APPARATUS AND CELL PRODUCTION EQUIPMENT

(71) Applicant: JIANGSU CONTEMPORARY AMPEREX TECHNOLOGY LIMITED, Changzhou (CN)

(72) Inventors: Jinhuo Gao, Changzhou (CN); Yu Luo, Changzhou (CN); Shengsheng Yu, Changzhou (CN); Houyong Li, Changzhou (CN); Feilong Xu, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 234 days.

(21) Appl. No.: 18/404,887

(22) Filed: Jan. 5, 2024

(65) Prior Publication Data

US 2024/0150149 A1 May 9, 2024

Related U.S. Application Data

(63) Continuation of application No. PCT/CN2022/124406, filed on Oct. 10, 2022.

(30) Foreign Application Priority Data

Oct. 26, 2021 (CN) .......................... 202111247530.2

(51) Int. Cl.
*B65H 43/04* (2006.01)
*B65H 43/08* (2006.01)
(Continued)

(52) U.S. Cl.
CPC ............. *B65H 43/04* (2013.01); *B65H 43/08* (2013.01); *G01N 21/89* (2013.01);
(Continued)

(58) Field of Classification Search
CPC ...... G01J 1/0422; G01J 1/0474; G01J 1/4228; G01J 1/44; G01J 1/4257; G02B 6/4206;
(Continued)

(56) References Cited

U.S. PATENT DOCUMENTS

2023/0361380 A1* 11/2023 Fang ................. H01M 10/0409

FOREIGN PATENT DOCUMENTS

CN 104297255 A 1/2015
CN 104577210 A 4/2015
(Continued)

OTHER PUBLICATIONS

The Extended European Search Report received in the corresponding European Application 22885642.3, mailed on Sep. 11, 2024.
(Continued)

*Primary Examiner* — Tony Ko
(74) *Attorney, Agent, or Firm* — K&L Gates LLP

(57) ABSTRACT

Provided are an electrode plate wrinkling detection apparatus and cell production equipment, pertaining to the field of battery technologies. The electrode plate wrinkling detection apparatus includes an image detection mechanism and a moving mechanism. The moving mechanism is configured to drive the image detection mechanism to move on a winding machine within a region directly facing a cell and adjust a shooting angle of the image detection mechanism. The image detection mechanism includes an image capture device and a detection module that are interconnected. The image capture device is configured to photograph a cell to obtain a picture of the cell and transmit the picture of the cell to the detection module. The detection module is configured to examine the picture of the cell to detect presence of electrode plate wrinkling using a grayscale algorithm and output a detection result.

11 Claims, 4 Drawing Sheets

(51) Int. Cl.
    *G01N 21/89*      (2006.01)
    *H01M 10/0587*    (2010.01)

(52) U.S. Cl.
    CPC ..... *H01M 10/0587* (2013.01); *B65H 2553/40* (2013.01); *B65H 2701/12* (2013.01); *G01N 2201/02* (2013.01)

(58) Field of Classification Search
    CPC .. G02B 6/4204; G02B 6/2793; G02B 6/2808; G02B 6/2813; G02B 6/4214
    See application file for complete search history.

(56) References Cited

FOREIGN PATENT DOCUMENTS

| | | | |
|---|---|---|---|
| CN | 106091999 | A | 11/2016 |
| CN | 108414524 | A | 8/2018 |
| CN | 109142368 | A | 1/2019 |
| CN | 208368664 | U | 1/2019 |
| CN | 109365307 | A | 2/2019 |
| CN | 109443418 | A | 3/2019 |
| CN | 111141755 | A | 5/2020 |
| CN | 211601860 | U | 9/2020 |
| CN | 211601861 | U | 9/2020 |
| CN | 112701343 | A | 4/2021 |
| CN | 113270630 | A | 8/2021 |
| DE | 102017223834 | A1 | 7/2018 |
| JP | 2009132524 | A | 6/2009 |
| JP | 2012251983 | A | 12/2012 |
| JP | 2014225340 | A | 12/2014 |
| WO | 2012/137594 | A1 | 10/2012 |

OTHER PUBLICATIONS

International Search Report received in the corresponding International Application PCT/CN2022/124406, mailed Dec. 16, 2022.

Written Opinion of ISA received in the corresponding International Application PCT/CN2022/124406, mailed Dec. 16, 2022.

Office Action (with English Machine Translation), mailed Jul. 22, 2025, for corresponding Chinese Patent Application Serial No. 202111247530.2.

Notice of Allowance (with English Machine Translation), mailed Mar. 9, 2026, for corresponding Chinese Patent Application Serial No. 202111247530.2.

* cited by examiner

1

ELECTRODE PLATE WRINKLING DETECTION APPARATUS AND CELL PRODUCTION EQUIPMENT

CROSS-REFERENCE TO RELATED APPLICATIONS

This application is a continuation of International Application PCT/CN2022/124406, filed on Oct. 10, 2022, which claims priority to Chinese patent application No. 202111247530.2, filed on Oct. 26, 2021, entitled "ELECTRODE PLATE WRINKLING DETECTION APPARATUS AND CELL PRODUCTION EQUIPMENT", which is incorporated herein by reference in its entirety.

TECHNICAL FIELD

This application pertains to the field of battery technologies, and more specifically, relates to an electrode plate wrinkling detection apparatus and cell production equipment.

BACKGROUND

In some cases, various defects may occur in batteries during the winding production process, such as wrinkling of electrode plates, folding of electrode plates, and bending of tabs. Cells with wrinkled electrode plates are subject to risks such as lithium precipitation induced short circuit and low capacity and therefore, such defects have become a significant concern in the production process. Typically, the approach to determine the presence of wrinkling in electrode plates involves consolidating battery cells produced by different winding machines onto a logistics line and relying on manual observation of the external appearance of the cells and disassembly of the cells. This approach suffers from low accuracy and consumes substantial human and material resources. Moreover, problematic cells are continually produced in this process. Operators are scheduled for machine adjustments after wrinkling defects in cells are detected, leading to delays.

SUMMARY

Embodiments of this application are intended to provide an electrode plate wrinkling detection apparatus and cell production equipment, so as to realize automated detection of electrode plate wrinkling.

A first aspect of this application provides an electrode plate wrinkling detection apparatus, including an image detection mechanism and a moving mechanism, where the moving mechanism is configured to drive the image detection mechanism to move on a winding machine within a region directly facing a cell and adjust a shooting angle of the image detection mechanism; the image detection mechanism includes an image capture device and a detection module that are interconnected, the image capture device being configured to photograph a cell to obtain a picture of the cell, and to transmit the picture of the cell to the detection module; and the detection module being configured to examine the picture of the cell to detect presence of electrode plate wrinkling using a grayscale algorithm and output a detection result.

The electrode plate wrinkling detection apparatus provided in this application includes an image detection mechanism and a moving mechanism. The image detection mechanism takes photos of cells on the winding machine and performs detection using a grayscale algorithm, thus able to detect the presence of wrinkling defects in the electrode plates through the separator and output accurate detection results. This enables timely identification of problematic cells and timely alert of operators to make adjustments, avoiding the continued production of wrinkled cells. It effectively reduces the investment of human and material resources and improves the accuracy of the detection results. The moving mechanism can drive the image detection mechanism to move within a plane parallel to the winding mandrel, and adjust the shooting angle of the image detection mechanism, thereby adapting to the detection requirements of different cell specifications.

In an embodiment, the image detection mechanism further includes an optical lens and a light source, the optical lens being provided on a lens interface of the image capture device, and a relative position between the light source and the optical lens is fixed. With the light source provided, when photographing cells in the winding process, the image detection mechanism can adjust the illumination field of the captured area to improve the quality of the obtained cell pictures. This reduces the difficulty of the detection and analysis of the cell pictures by the detection module at a later stage and improves the accuracy of the detection results.

In an embodiment, the image capture device is oriented towards a winding mandrel that winds the cell on the winding machine and/or an electrode plate tangent to the winding mandrel. In general, it is sufficient to set the shooting direction of the image capture device towards the winding mandrel, and in particular, it is optimal to set the shooting direction towards the side of the winding mandrel opposite to the entry of the electrode plate. This setting allows obtaining unobstructed pictures of wound cells without interfering with the cell winding production process. However, due to process reasons, there may exist on the separator separator stripes, separator stains, and the like that do not affect the quality of the cell but cause interference to the detection of wrinkling of the electrode plate. Therefore, the shooting direction of the image capture device is adjusted so that the shooting direction of the image capture device is oriented towards the electrode plate tangent to the winding mandrel, thus obtaining more accurate and detailed cell pictures.

In an embodiment, the moving mechanism includes a slide rail, a slider, and a connecting seat, the slide rail being parallel to the winding mandrel, the slider being slidably provided on the slide rail, and the connecting seat being slidably provided on the slider and moving in a direction approaching or leaving the winding mandrel; and the image capture device is connected to the connecting seat. Through the cooperation of the slide rail, the slider, and the connecting seat, it is possible to adjust the shooting position of the image capture device in a direction parallel to the winding mandrel to move closer to or away from the winding mandrel, thereby adapting to different cell specifications such as diameter and height.

In an embodiment, the connecting seat includes a side plate and a bottom plate that are vertically connected, the side plate being provided with a rotary shaft parallel to the winding mandrel and the image capture device being connected to the side plate via the rotary shaft; and the connecting seat is slidably provided on the slider via the bottom plate. Specifically, the vertically connected side plate and bottom plate provide fitting positions for connecting the image capture device and for connecting the slider. The provision of the rotary shaft enables the adjustment of the shooting angle of the image capture device to adapt to more usage requirements.

In an embodiment, the side plate is further provided with a through slot extending from an edge of the side plate to where the side plate is connected to the rotary shaft, the through slot being configured for providing a limiting member, where the limiting member penetrates into the through slot and abuts against the rotary shaft so as to prevent the rotary shaft from rotating. To maintain an angle of the image capture device after it has been adjusted to that angle, it is only necessary to insert the limiting member into the through slot until it abuts against the peripheral surface of the rotary shaft.

In an embodiment, several first through holes are provided on a side of the slider where the slider and the bottom plate connect, the several first through holes being evenly distributed in an array on the slider along a direction perpendicular to the winding mandrel. The purpose of the several first through holes provided on the slider is to enable the image capture device to move closer to the winding mandrel or away from the winding mandrel.

In an embodiment, several second through holes are provided on the bottom plate, the several second through holes being evenly distributed in an array on the bottom plate along a direction perpendicular to the winding mandrel. The first through holes and the second through holes are connected by a first connecting member; and a relative position between the image capture device and the slider is adjusted by adjusting insertion of the first connecting member into first through holes and second through holes in different positions, so as to enable the image capture device to move closer to or away from the winding mandrel. Corresponding to the slider, the bottom plate of the connecting seat is provided with second through holes. The coordination of the first through holes, the second through holes, and the first connecting member enables stepwise adjustment of the distance of the image capture device moving closer to or away from the winding mandrel.

In an embodiment, the bottom plate is provided with a second connecting member and a slide groove perpendicular to the direction of the winding mandrel, one end of the second connecting member being slidably provided in the slide groove and the other end being embedded in the first through hole. To realize stepless adjustment of the distance of the image capture device moving closer to or away from the winding mandrel, in this embodiment, the foregoing second through holes are replaced with a slide groove. The cooperation of the first through holes, the slide groove, and the second connecting member enables irregular or fine adjustment of the distance of the image capture device moving closer to or away from the winding mandrel.

In an embodiment, both the slide rail and the side plate are provided with scales, so that an adjustment value is knowable and fine management of the detection process is conveniently realized.

A second aspect of this application provides cell production equipment including a winding machine and at least one electrode plate wrinkling detection apparatus according to the foregoing embodiments.

In the cell production equipment provided in this application, an electrode plate wrinkling detection apparatus is provided on the winding machine to photograph cells in the winding process and obtain cell pictures. Then, detection for electrode plate wrinkling is performed based on the cell pictures by using a grayscale algorithm. This allows for rapid and accurate obtaining of detection results, greatly reducing the investment of human and material resources. Moreover, the timely detection of wrinkling defects in the electrode plates facilitates the timely identification of a problematic winding machine, allowing operators to make timely adjustments, thereby avoiding the situation of subsequent continued production of problematic cells. Depending on the specific production requirements, the position of the electrode plate wrinkling detection apparatus can be adjusted, thereby adjusting the shooting direction of the image capture device.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show only some embodiments of this application, and persons of ordinary skill in the art may still derive other drawings from these accompanying drawings without creative efforts.

REFERENCE SIGNS IN THE ACCOMPANYING DRAWINGS

Figure 1:
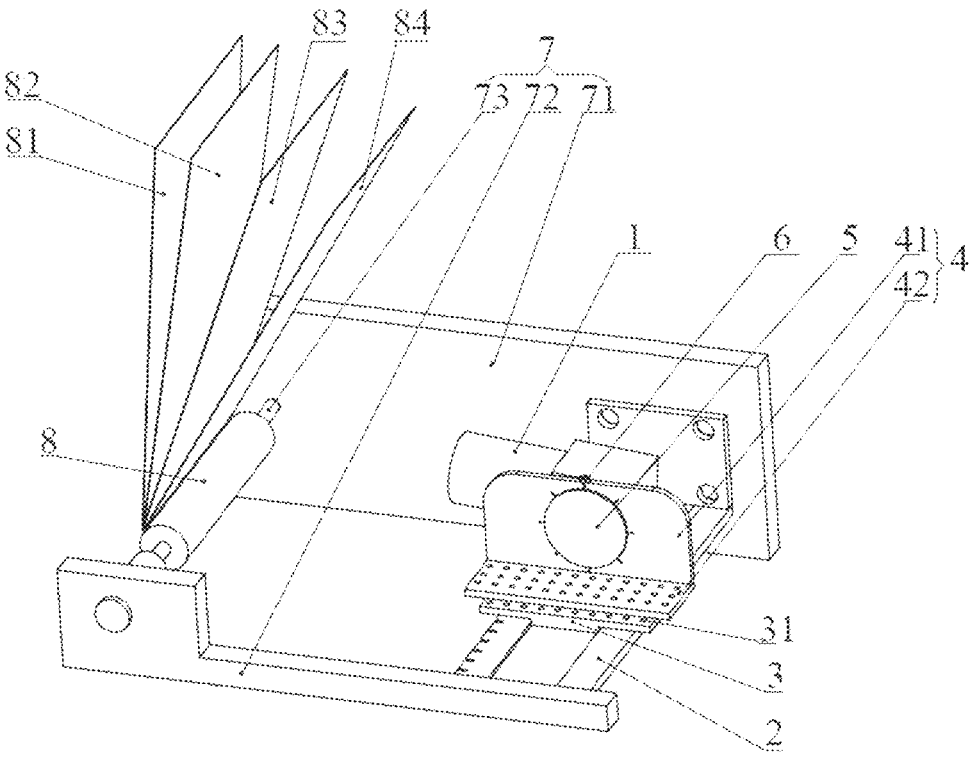
FIG. 1 is a schematic structural diagram of cell production equipment according to embodiment 1 of this application.

1. CCD detection mechanism; 2. slide rail; 3. slider; 31. first through hole; 4. connecting seat; 41. side plate; 411. through slot; 42. bottom plate; 421$a$. second through hole; 421$b$. slide groove; 5. rotary shaft; 6 limiting member;

7. winding machine; 71. first support plate; 72. second support plate; 73. winding mandrel;

8. cell; 81. first separator; 82. anode plate; 83. second separator; and 84: cathode plate.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

Currently, from a perspective of the market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military device, and aerospace. With the continuous expansion of application fields of traction batteries, market demands for traction batteries are also expanding.

A battery production process involves the manufacture of cell, and the quality of the cell directly affects the quality of the battery. A manufacturing process of wound cells specifically involves arranging well-cut electrode plates and separators in order, and then rotating the winding mandrel to roll the electrode plates and separators into a layer-wrapped jelly roll, that is, the cell. Various defects may occur during the winding production process, such as wrinkling of electrode plates, folding of electrode plates, and bending of tabs. Among them, cells with wrinkled electrode plates are subject to risks such as lithium precipitation induced short circuit and low capacity and therefore, such defects require special concerns.

The applicant has observed that in some cases, it is typical to consolidate, after a batch of cells are wound, cells produced by different winding machines onto a logistics line and rely on manual observation of the external appearance of the cells and disassembly of the cells to determine if wrinkling exists in the electrode plates. However, manual observation of the external appearance of the cells suffers from low accuracy and is prone to false positives and false negatives, resulting in problematic cells being released. Disassembling the cells can lead to the loss of normal cells after disassembly and requires a significant amount of human and material resources in the process of differentiating between normal and problematic cells. In addition, the process from the generation to the identification of wrinkling defects in electrode plates takes a long time, during which the winding machine that generates the problematic cells will continue to produce cells with a wrinkled electrode plate, which increases the production cost.

For timely identification of problematic cells and the corresponding winding machine that produces the problematic cells, the applicant has found that it is possible to check the conditions of the electrode plates during the winding production process of cells. Thus, by detecting electrode plate wrinkling at an early stage, the problematic cells and the corresponding winding machine that produces the problematic cells can be discovered at an early stage. Based on the foregoing considerations, the inventors have designed, after in-depth research, an electrode plate wrinkling detection apparatus and cell production equipment using such electrode plate wrinkling detection apparatus.

This application provides an electrode plate wrinkling detection apparatus, including an image detection mechanism and a moving mechanism. The moving mechanism is configured to drive the image detection mechanism to move on a winding machine within a region directly facing a cell and adjust a shooting angle of the image detection mechanism. The image detection mechanism includes an image capture device and a detection module that are interconnected. The image capture device is configured to photograph a cell to obtain a picture of the cell and transmit the picture of the cell to the detection module. The detection module is configured to examine the picture of the cell to detect presence of electrode plate wrinkling using a grayscale algorithm and output a detection result.

The electrode plate wrinkling detection apparatus provided in this application includes an image detection mechanism and a moving mechanism. The image detection mechanism takes photos of cells on the winding machine and performs detection using a grayscale algorithm, thus able to detect the presence of wrinkling defects in the electrode plates through the separator and output accurate detection results. This enables timely identification of problematic cells and the winding machine that produces the problematic cells and timely alert of operators to make adjustments, avoiding the continued production of wrinkled cells. It effectively reduces the investment of human and material resources and improves the accuracy of the detection results. The moving mechanism can drive the image detection mechanism to move within a plane parallel to the winding mandrel, and adjust the shooting angle of the image detection mechanism, thereby adapting to the detection requirements of different cell specifications. The grayscale algorithm specifically determines the presence of wrinkling in an electrode plate by comparing the grayscale values of a wrinkled region with those of a normal region.

It should be understood that electrode plates are categorized into anode plates and cathode plates. In the case of a lithium-ion battery, the anode plate is coated with one or more of slurries of graphite, silicon, silicon oxide, a mixture of graphite and silicon, and the like to form an anode active material coating; and the cathode plate is coated with a slurry containing lithium ions to form a cathode active material coating. A separator is provided between the anode plate and the cathode plate.

The separator is a film used to separate the positive and negative electrodes so as to prevent energy loss caused by direct reaction in the electrolytic cell during the electrolytic reaction. In the structure of a lithium battery, the separator is one of the key inner components. The performance of the separator determines the interface structure, internal resistance, and the like of the battery, which directly affect battery characteristics such as capacity, cycling, and safety performance. A high-performance separator plays an important role in improving the comprehensive performance of the battery.

A cell is a single electrochemical cell including positive and negative electrodes, formed by stacking or winding the electrode plates and the separators in a certain order, and is generally not used directly.

The electrode plate wrinkling detection apparatus disclosed in the embodiments of this application may, but is not limited to, be used in cell production processes involving a winding step, such as the production processes of lithium-ion batteries, sodium-ion batteries, and the like. The electrode plate wrinkling detection apparatus provided in the embodiments of this application is conducive to the timely identification of wrinkled electrode plates, during the production process of cells, allowing for timely identification of problematic cells and the winding machine that produces the problematic cells. As a result, the problematic cells are accurately picked out, and the winding machine that produces the problematic cells is adjusted so as to avoid continuous production of problematic cells. This achieves the purpose of reducing production loss while avoiding the release of problematic cells.

The following describes in detail the electrode plate wrinkling detection apparatus and cell production equipment provided by this application with reference to specific embodiments.

The "image capture device" in this application may include various devices capable of acquiring images, such as various image capture devices based on a CCD (Charge Coupled Device, charge coupled device) or CMOS (Complementary Metal Oxide Semiconductor, complementary metal oxide semiconductor) sensor. The following description uses a CCD detection structure using a CCD camera as an example to illustrate the technical solution of this application. It should be understood that the technical solutions of this application are not limited to CCD cameras and CCD camera-based detection mechanisms.

Embodiment 1

Referring to FIG. 1, embodiment 1 of this application provides an electrode plate wrinkling detection apparatus including a CCD detection mechanism 1 and a moving mechanism. The CCD detection mechanism 1 includes a CCD camera and a detection module that are interconnected. The CCD camera is configured to photograph a cell 8 in a winding process to obtain a picture of the cell 8 and transmit the picture of the cell 8 to the detection module. The detection module is configured to examine the picture of the cell 8 to detect presence of electrode plate wrinkling using a grayscale algorithm and output a detection result. An optical lens is provided at the lens interface of the CCD camera, and the optical lens can be replaced according to actual demands. A light source is also provided on the CCD camera, and the light source may be an LED light source. The LED light source is used to adjust the illumination field of the captured area, and in conjunction with the moving mechanism, this helps to capture clearer pictures of the cell 8, facilitating the use of the pictures in subsequent detection.

In this embodiment, the moving mechanism is configured to drive the CCD detection mechanism 1 to move on a winding machine 7 within a region directly facing the cell 8 and adjust a shooting angle of the CCD detection mechanism 1. Specifically, the moving mechanism includes a slide rail 2, a slider 3, and a connecting seat 4, the slide rail 2 being parallel to the winding mandrel 73, the slider 3 being slidably provided on the slide rail 2, and the connecting seat 4 being slidably provided on the slider 3 and moving in a direction approaching or leaving the winding mandrel 73. The slide rail 2 may include two branch rails parallel to the winding mandrel 73. The bottom of the slider 3 is provided with a convex part, and the convex part is slidably provided between the two branch rails, thereby enabling the slider 3 to slide on the slide rail 2 in a more stable and reliable manner. The CCD camera is provided on the connecting seat 4. The connecting seat 4 includes a side plate 41 and a bottom plate 42 that are vertically connected. The side plate 41 is provided with a rotary shaft 5 parallel to the winding mandrel 73. The CCD camera is connected to the side plate 41 via the rotary shaft 5 to realize an adjustable shooting angle of the CCD camera. To maintain the adjusted shooting angle, the side plate 41 is also provided with a through slot 411 extending from an edge of the side plate 41 to where the side plate 41 is connected to the rotary shaft 5. The through slot 411 is configured for providing a limiting member 6. The limiting member 6 penetrates into the through slot 411 and abuts against the rotary shaft 5 so as to prevent the rotary shaft 5 from rotating. The limiting member 6 may be a bolt. Scales are provided on the outer side of the connection between the side plate 41 and the rotary shaft 5, allowing precise adjustment of the shooting angle and providing information about the adjusted angle. The connecting seat 4 is slidably provided on the slider 3 via the bottom plate 42.

Figure 2:
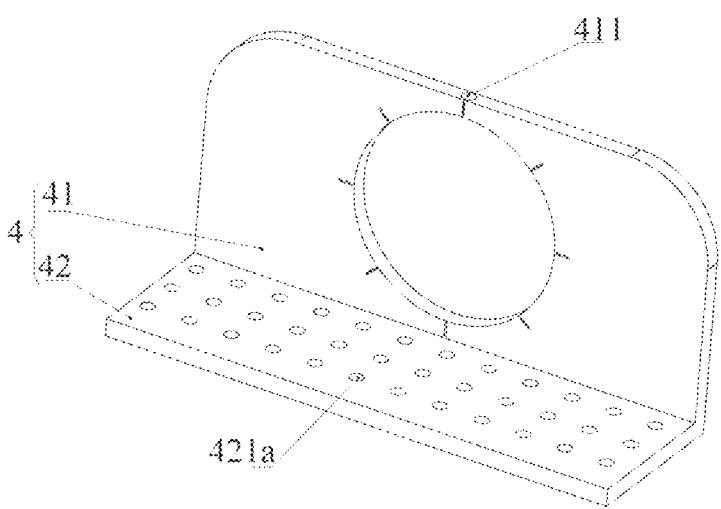
FIG. 2 is a schematic structural diagram of a connecting seat according to embodiment 1 of this application.

In this embodiment, several first through holes 31 are provided on a side of the slider 3 where the slider 3 and the bottom plate 42 connect, the several first through holes 31 being evenly distributed in an array on the slider 3 along a direction perpendicular to the winding mandrel 73. A specific structure of the connecting seat 4 is shown in FIG. 2. Several second through holes 421a are provided on the bottom plate 42, the several second through holes 421a being evenly distributed in an array on the bottom plate 42 along a direction perpendicular to the winding mandrel 73. The first through holes 31 and the second through holes 421a are connected by a first connecting member; and a relative position between the CCD camera and the slider 3 is adjusted by adjusting insertion of the first connecting member into first through holes 31 and second through holes 421a in different positions, thereby realizing stepwise adjustment of the CCD camera moving closer to or away from the winding mandrel 73. The above adjustment values are knowable.

As can be seen, with the cooperation of the slide rail 2, the slider 3, and the connecting seat 4, the CCD camera can be moved traversely on the slide rail 2 via the slider 3, or be moved longitudinally on the slider 3 via the connecting seat 4, according to the photographing needs. In addition, the shooting angle of the CCD camera can be adjusted by rotating the rotary shaft 5. With the use of the LED light source, a clearer and higher-quality picture of the cell 8 can be obtained.

Figure 3:
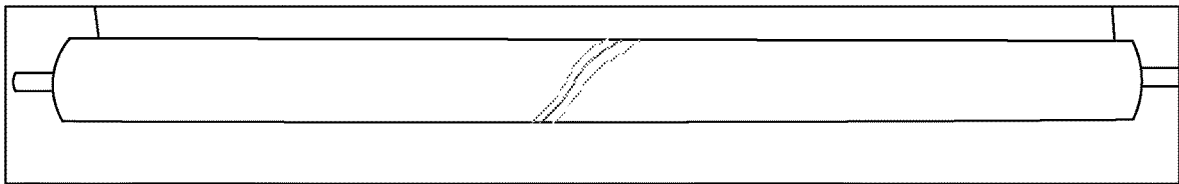
FIG. 3 is a schematic diagram of a cell with a wrinkled electrode plate according to an embodiment of this application.

In this embodiment, this application also provides cell production equipment using such electrode plate wrinkling detection apparatus. The cell production equipment further includes a winding machine 7, the winding machine 7 including a first support plate 71 and a second support plate 72 arranged opposite each other, where a winding mandrel 73 is provided between the first support plate 71 and the second support plate 72 and the winding mandrel 73 is configured to wind the cell 8. The first separator 81, the anode plate 82, the second separator 83, and the cathode plate 84 are wound on the winding mandrel 73 in the order of the first separator 81, the anode plate 82, the second separator 83, and the cathode plate 84 from far to near. In the winding process, the winding mandrel 73 drives the first separator 81, the anode plate 82, the second separator 83, and the cathode plate 84 to spin at a high speed, tightly winding them together to form the battery cell 8. Since the material of the separator is thin and flexible, any wrinkling defects that occur in the electrode plates can be shown through the separator. In this embodiment, the shooting direction of the CCD camera is oriented towards the winding mandrel 73 so as to obtain a picture of the wound cell 8. For example, a picture of the cell 8 with a wrinkled electrode plate is shown in FIG. 3. Then, the detection module utilizes a grayscale algorithm to analyze and determine the wrinkling of the electrode plate based on the grayscale value differences between a wrinkled region and a normal region. Specifically, an ROI box is drawn within the detection range of the picture of the cell 8, and the grayscale values within the box are monitored. When wrinkling of an electrode plate occurs, there will be a noticeable change in the grayscale values within the ROI box. Through experiments, a correspondence between the grayscale values and the wrinkling of an electrode plate is determined, and a grayscale value threshold is ultimately established. Then, the wrinkling condition of the electrode plate is determined. This enables automated detection of wrinkling of electrode plates. In this embodiment, the wrinkling of the anode plate 82 can be observed through the first separator 81. When wrinkling of an electrode plate occurs, the operator can make timely adjustments to the machine to reduce the occurrence of subsequent wrinkling issues in the electrode plates in the cell 8 caused by delayed response. More specifically, to eliminate the influence of winding speed on the detection of wrinkling of the electrode plate, it is set that a photo of the anode plate 82 is taken every 40 mm it travels. In an actual production process, the CCD detection mechanism 1 of the electrode plate wrinkling detection apparatus can be configured to be connected to the winding machine 7, so that the detection results can be transmitted to the winding machine 7. When the detection results indicate wrinkling of an electrode plate, the winding machine 7 automatically marks the cell 8 determined as having a wrinkled electrode plate as defective, and discharges it into the NG slot to separate it from normal cells 8.

Embodiment 2

Figure 4:
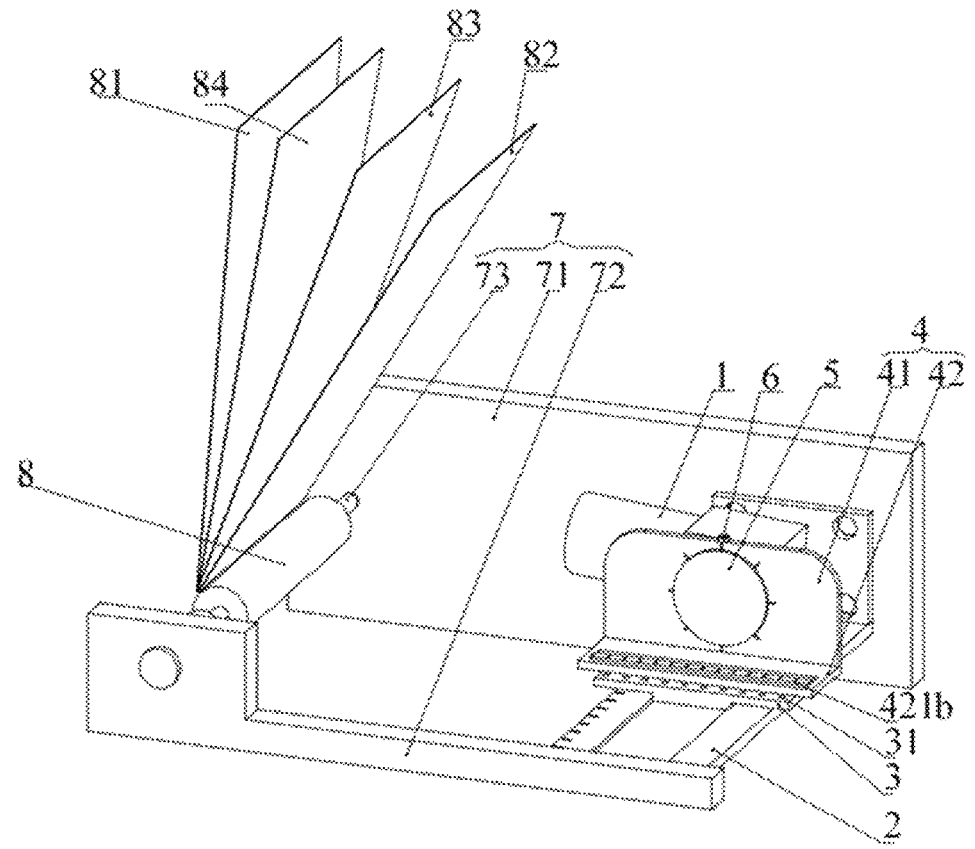
FIG. 4 is a schematic structural diagram of cell production equipment according to embodiment 2 of this application.

Due to process reasons, separators may have issues such as separator stripes and separator stains that do not affect the quality of the cell 8 but cause interference to the detection of electrode plate wrinkling Embodiment 2 of this application provides cell production equipment, as shown in FIG. 4. The first separator 81, the cathode plate 84, the second separator 83, and the anode plate 82 are wound on the winding mandrel 73 in the order of the first separator 81, the cathode plate 84, the second separator 83, and the anode plate 82 from far to near. In the winding process, the winding mandrel 73 drives the first separator 81, the cathode plate 84, the second separator 83, and the anode plate 82 to spin at a high speed, tightly winding them together to form the cell 8.

Due to material reasons, the cathode plate 84 is harder and less prone to wrinkling during the winding and production process, while the anode plate 82 often experiences wrinkling issues. When the first separator 81, the cathode plate 84, the second separator 83, and the anode plate 82 are wound in the foregoing order, the cathode plate 84 is positioned on an outer layer with respective to the anode plate 82. If the same detection position as in embodiment 1 is still used to inspect the cell 8, the anode plate 82 cannot be well observed. Therefore, in this embodiment, the shooting direction of the CCD camera can be adjusted slightly upward by rotating the rotary shaft 5, allowing for photographing the electrode plate tangent to the winding mandrel 73.

Figure 5:
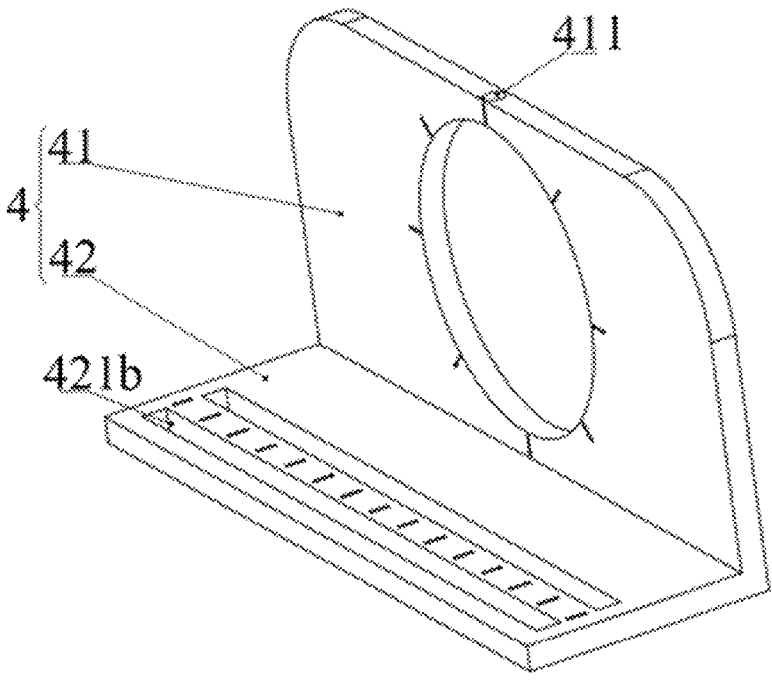
FIG. 5 is a schematic structural diagram of a connecting seat according to embodiment 2 of this application.

In this embodiment, several first through holes 31 are provided on a side of the slider 3 where the slider 3 and the bottom plate 42 connect, the several first through holes 31 being evenly distributed in an array on the slider 3 along a direction perpendicular to the winding mandrel 73. As shown in FIG. 5, the bottom plate 42 is provided with a second connecting member and a slide groove 421b perpendicular to the direction of the winding mandrel 73, one end of the second connecting member being slidably provided in the slide groove 421b and the other end being embedded in the first through hole 31. By adjusting the position of the second connecting member in the slide groove 421b, the relative position between the CCD camera and the slider 3 is adjusted, thereby realizing stepless adjustment of the CCD camera to move closer to or away from the winding mandrel 73. Compared to embodiment 1, the provision of the slide groove 421b in the connecting seat 4 provided in embodiment 2 enables more flexibility because the distance that the CCD camera moves closer to or away from the winding mandrel 73 is not limited to any fixed values. This facilitates the realization of small distance adjustment. In conjunction with the provision of scales next to the slide groove 421*b*, the value of the adjusted distance can be easily known. In addition, to ensure the stability of the relative movement between the slider 3 and the connecting seat 4, two parallel slide grooves 421*b* can be provided on the bottom plate 42, and two corresponding first through holes 31 in the slider 3 are both provided with an embedded second connecting member, thereby ensuring that a second connecting member is slidably connected to each of the slide grooves 421*b*. This avoids the relative rotation between the connecting seat 4 and the slider 3, and ultimately realizes the stability and reliability of the sliding of the connecting seat 4 on the slider 3.

Figure 6:
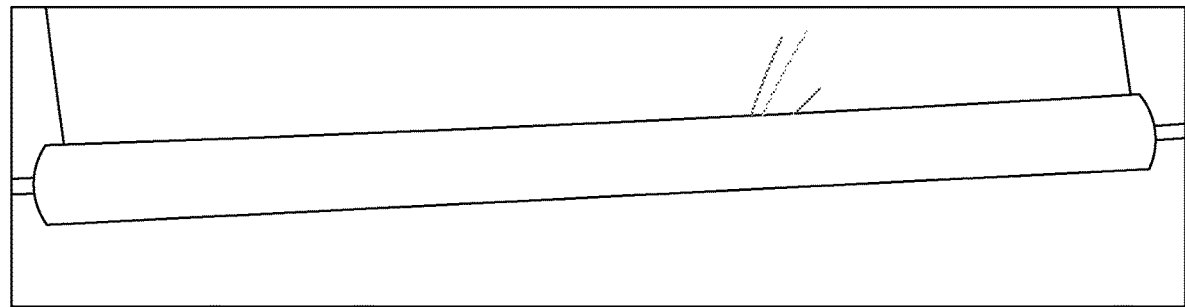
FIG. 6 is a schematic diagram of another cell with a wrinkled electrode plate according to an embodiment of this application.

In this embodiment, pictures of the anode plate 82 at the position before winding can be directly captured, as shown in FIG. 6. It should be understood that when it is detected from a captured picture that wrinkling has occurred in the anode plate 82 before winding, the wrinkling issue will persist in the process that the winding mandrel 73 continues to rotate to wind the separators and electrode plates into cells 8, thereby producing problematic cells 8 with a wrinkled electrode plate. Therefore, considering the inherent issues of the separators (such as stripes or stains that do not affect the quality of the cell 8), the ordering sequence of electrode plates and separators, and even other considerations in the production process, the shooting angle of the CCD camera can be adjusted accordingly to obtain pictures of the cell 8 that can provide a basis for accurate judgment in subsequent electrode plate wrinkling detection. Analysis and judgment on the wrinkling of the electrode plates are performed based on the grayscale value differences between a wrinkled region and a normal region in the obtained pictures of the cell 8. Thus, automated detection of electrode plate wrinkling can be achieved, eliminating interferences caused by problematic separators.

The other settings in this embodiment are the same as those in embodiment 1, and will not be repeated herein.

Embodiment 3

Figure 7:
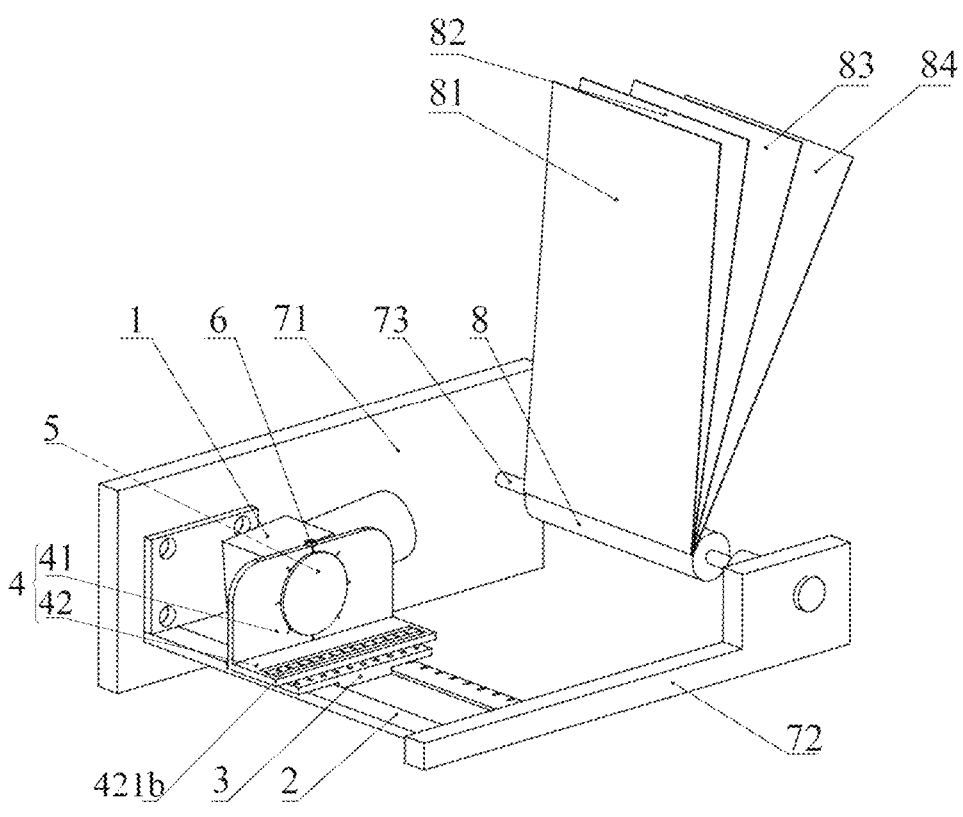
FIG. 7 is a schematic structural diagram of cell production equipment according to embodiment 3 of this application.

Embodiment 3 of this application provides cell production equipment, as shown in FIG. 7. The electrode plate wrinkling detection apparatus includes a CCD detection mechanism 1 and a moving mechanism. The CCD detection mechanism 1 includes a CCD camera and a detection module that are interconnected. The CCD camera is configured to photograph a cell 8 in a winding process to obtain a picture of the cell 8 and transmit the picture of the cell 8 to the detection module. The detection module is configured to examine the picture of the cell 8 to detect presence of electrode plate wrinkling using a grayscale algorithm and output a detection result. An optical lens is provided at the lens interface of the CCD camera, and the optical lens can be replaced according to actual demands. A light source is also provided on the CCD camera, and the light source may be an LED light source. The LED light source is used to adjust the illumination field of the captured area, and in conjunction with the moving mechanism, this helps to capture clearer pictures of the cell 8, facilitating the use of the pictures in subsequent detection.

In this embodiment, the moving mechanism is configured to drive the CCD detection mechanism 1 to move on a winding machine 7 within a region directly facing the cell 8 and adjust a shooting angle of the CCD detection mechanism 1. Specifically, the moving mechanism includes a slide rail 2, a slider 3, and a connecting seat 4, the slide rail 2 being parallel to the winding mandrel 73, the slider 3 being slidably provided on the slide rail 2, and the connecting seat 4 being slidably provided on the slider 3 and moving in a direction approaching or leaving the winding mandrel 73. The slide rail 2 may include two branch rails parallel to the winding mandrel 73, one of the branch rails being provided with engraved scales. The bottom of the slider 3 is provided with a convex part, and the convex part is slidably provided between the two branch rails, thereby enabling the slider 3 to slide on the slide rail 2 in a more stable and reliable manner. The CCD camera is provided on the connecting seat 4. The connecting seat 4 includes a side plate 41 and a bottom plate 42 that are vertically connected. The side plate 41 is provided with a rotary shaft 5 parallel to the winding mandrel 73. The CCD camera is connected to the side plate 41 via the rotary shaft 5 to realize an adjustable shooting angle of the CCD camera. To maintain the adjusted shooting angle, the side plate 41 is also provided with a through slot 411 extending from an edge of the side plate 41 to where the side plate 41 is connected to the rotary shaft 5. The through slot 411 is configured for providing a limiting member 6. The limiting member 6 penetrates into the through slot 411 and abuts against the rotary shaft 5 so as to prevent the rotary shaft 5 from rotating. The limiting member 6 may be a bolt. Scales are provided on the outer side of the connection between the side plate 41 and the rotary shaft 5, allowing precise adjustment of the shooting angle. The connecting seat 4 is slidably provided on the slider 3 via the bottom plate 42.

In this embodiment, several first through holes 31 are provided on a side of the slider 3 where the slider 3 and the bottom plate 42 connect, the several first through holes 31 being evenly distributed in an array on the slider 3 along a direction perpendicular to the winding mandrel 73. The bottom plate 42 is provided with a second connecting member and a slide groove 421*b* perpendicular to the direction of the winding mandrel 73, one end of the second connecting member being slidably provided in the slide groove 421*b* and the other end being embedded in the first through hole 31. By adjusting the position of the second connecting member in the slide groove 421*b*, the relative position between the CCD camera and the slider 3 is adjusted, thereby realizing stepless adjustment of the CCD camera to move closer to or away from the winding mandrel 73. As shown in FIG. 5, the structure of the connecting seat 4 in this embodiment is consistent with the structure of the connecting seat 4 in embodiment 2 in that both of them use a stepless method to adjust the distance that the connecting seat 4 moves on the slider 3. The above adjustment values are knowable.

As can be seen, with the cooperation of the slide rail 2, the slider 3, and the connecting seat 4, the CCD camera can be moved traversely on the slide rail 2 via the slider 3 or be moved longitudinally on the slider 3 via the connecting seat 4, according to the photographing needs. In addition, the shooting angle of the CCD camera can be adjusted by rotating the rotary shaft 5. With the use of the LED light source, a clearer and higher-quality picture of the cell 8 can be obtained.

In this embodiment, the winding machine 7 includes a first support plate 71 and a second support plate 72 arranged opposite each other, where a winding mandrel 73 is provided between the first support plate 71 and the second support plate 72 and the winding mandrel 73 is configured to wind the cell 8. The first separator 81, the anode plate 82, the second separator 83, and the cathode plate 84 are wound on the winding mandrel 73 in the order of the first separator 81, the anode plate 82, the second separator 83, and the cathode plate 84 from far to near. In the winding process, the winding mandrel 73 drives the first separator 81, the anode plate 82, the second separator 83, and the cathode plate 84 to spin at a high speed, tightly winding them together to form the battery cell 8. Since the material of the separator is thin and flexible, any wrinkling defects that occur in the electrode plates can be shown through the separator. In this embodiment, the shooting direction of the CCD camera is oriented towards the electrode plate tangent to the winding mandrel 73 (located at the other side of the winding mandrel 73, symmetrical to the position of the electrode plate wrinkling detection apparatus in embodiment 1) so as to obtain a picture of the wound cell 8. This embodiment is similar to embodiment 1 in that the wrinkling of the anode plate 82 is also observed through the first separator 81. Then, the detection module utilizes a grayscale algorithm to analyze and determine the wrinkling of the electrode plate based on the grayscale value differences between a wrinkled region and a normal region. Specifically, an ROI box is drawn within the detection range of the picture of the cell 8, and the grayscale values within the box are monitored. When wrinkling of an electrode plate occurs, there will be a noticeable change in the grayscale values within the ROI box. Through experiments, a correspondence between the grayscale values and the wrinkling of an electrode plate is determined, and a grayscale value threshold is ultimately established. Then, the wrinkling condition of the electrode plate is determined. This enables automated detection of wrinkling of electrode plates. Due to material reasons, the cathode plate 84 is harder and less prone to wrinkling during the winding and production process, while the anode plate 82 often experiences wrinkling issues. In this embodiment, the wrinkling of the anode plate 82 can be observed through the first separator 81. When wrinkling of an electrode plate occurs, the operator can make timely adjustments to the machine to reduce the occurrence of subsequent wrinkling issues in the electrode plates in the cell 8 caused by delayed response. More specifically, to eliminate the influence of winding speed on the detection of wrinkling of the electrode plate, it is set that a photo of the anode plate 82 is taken every 40 mm it travels. The winding machine 7 automatically marks a cell 8 determined as having a wrinkled electrode plate as defective, and discharges it into the NG slot to separate it from normal cells 8.

Embodiment 4

Figure 8:
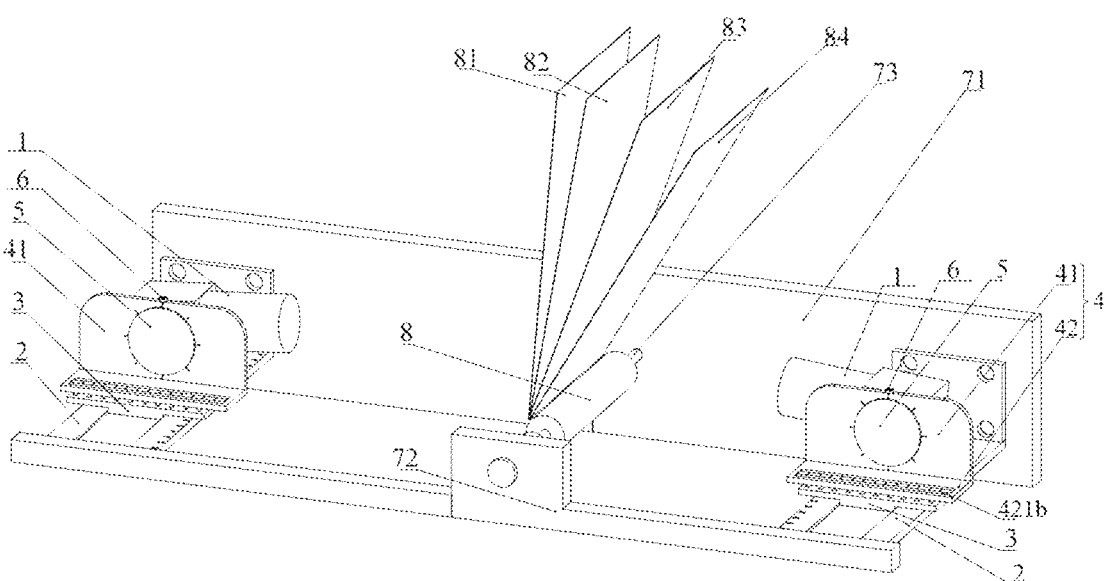
FIG. 8 is a schematic structural diagram of cell production equipment according to embodiment 4 of this application.

Embodiment 4 of this application provides cell production equipment, as shown in FIG. 8. On the winding machine 7, the first separator 81, the anode plate 82, the second separator 83, and the cathode plate 84 are wound on the winding mandrel 73 in the order of the first separator 81, the anode plate 82, the second separator 83, and the cathode plate 84 from far to near. In the winding process, the winding mandrel 73 drives the first separator 81, the anode plate 82, the second separator 83, and the cathode plate 84 to spin at a high speed, tightly winding them together to form the battery cell 8. In this embodiment, one electrode plate wrinkling detection apparatus is provided on each of the left and right sides of the winding machine 7, where the shooting direction of the CCD camera in one of the electrode plate wrinkling detection apparatuses is oriented towards the winding mandrel 73, and the shooting direction of the CCD camera in the other electrode plate wrinkling detection apparatus is oriented towards the electrode plate that is tangent to the winding mandrel 73. In the winding process, the electrode plates and the separators are tightly wound together from a separated state. If wrinkling occurs in an electrode plate, the wrinkled region will be extended at the part that the electrode plate is tangent to the winding mandrel 73. The material of the separator is thin and flexible, allowing the wrinkling of the electrode plates to be displayed through the separator. By taking pictures of the cell 8 and the cathode plate 84 separately, and by performing analysis and judgment on the wrinkling of the electrode plates based on the grayscale value differences between a wrinkled region and a normal region, automated detection of electrode plate wrinkling can be achieved. When wrinkling of an electrode plate occurs, the operator can make timely adjustments to the machine to reduce the occurrence of wrinkling in the electrode plates caused by delayed response.

The left and right sides of the winding machine 7 are each provided with an electrode plate wrinkling detection apparatus, and thus pictures of the cell 8 are obtained on both the left and right sides of the winding mandrel 73 of the winding machine 7. Through experiments, a correspondence between the grayscale values and the wrinkling of the electrode plate is determined, and respective grayscale value thresholds are ultimately established for the two. Then, the wrinkling condition of the electrode plate is determined and cross-validated. When the grayscale value of a picture taken by either CCD camera is not within the range of normal grayscale values, wrinkling of the electrode plate is determined. The winding machine automatically marks a cell 8 determined as having a wrinkled electrode plate as defective, and discharges it into the NG slot to separate it from normal cells 8.

The other settings in this embodiment are the same as those in embodiment 3, and will not be repeated herein.

It should be noted that the above embodiments are merely intended for describing the technical solutions of this application but not for limiting this application. Although this application is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this application.

What is claimed is:

1. An electrode plate wrinkling detection apparatus, comprising an image detection mechanism and a moving mechanism, wherein the moving mechanism is configured to drive the image detection mechanism to move on a winding machine within a region directly facing a cell and to adjust a shooting angle of the image detection mechanism;

the image detection mechanism comprises an image capture device and a detection module that are interconnected, the image capture device being configured to photograph a cell in a winding process to obtain a picture of the cell and transmit the picture of the cell to the detection module; and the detection module being configured to examine the picture of the cell to detect presence of electrode plate wrinkling using a grayscale algorithm and output a detection result.

2. The electrode plate wrinkling detection apparatus according to claim 1, wherein the image detection mechanism further comprises an optical lens and a light source, the optical lens being provided on a lens interface of the image capture device, and a relative position between the light source and the optical lens is fixed.

3. The electrode plate wrinkling detection apparatus according to claim 1, wherein the image capture device is oriented towards a winding mandrel that winds the cell on the winding machine and/or an electrode plate tangent to the winding mandrel.

4. The electrode plate wrinkling detection apparatus according to claim 3, wherein the moving mechanism comprises a slide rail, a slider, and a connecting seat, the slide rail being parallel to the winding mandrel, the slider being slidably provided on the slide rail, and the connecting seat being slidably provided on the slider and moving in a direction approaching or leaving the winding mandrel; and the image capture device is connected to the connecting seat.

5. The electrode plate wrinkling detection apparatus according to claim 4, wherein the connecting seat comprises a side plate and a bottom plate that are vertically connected, the side plate being provided with a rotary shaft parallel to the winding mandrel and the image capture device being connected to the side plate via the rotary shaft; and the connecting seat is slidably provided on the slider via the bottom plate.

6. The electrode plate wrinkling detection apparatus according to claim 5, wherein the side plate is further provided with a through slot extending from an edge of the side plate to where the side plate is connected to the rotary shaft, the through slot being configured for providing a limiting member, wherein the limiting member penetrates into the through slot and abuts against the rotary shaft so as to prevent the rotary shaft from rotating.

7. The electrode plate wrinkling detection apparatus according to claim 5, wherein several first through holes are provided on a side of the slider where the slider and the bottom plate connect, the several first through holes being evenly distributed in an array on the slider along a direction perpendicular to the winding mandrel.

8. The electrode plate wrinkling detection apparatus according to claim 7, wherein several second through holes are provided on the bottom plate, the several second through holes being evenly distributed in an array on the bottom plate along a direction perpendicular to the winding mandrel;

the first through holes and the second through holes are connected by a first connecting member; and a relative position between the image capture device and the slider is adjusted by adjusting insertion of the first connecting member into first through holes and second through holes in different positions, so as to enable the image capture device to move closer to or away from the winding mandrel.

9. The electrode plate wrinkling detection apparatus according to claim 8, wherein both the slide rail and the side plate are provided with scales.

10. The electrode plate wrinkling detection apparatus according to claim 7, wherein the bottom plate is provided with a second connecting member and a slide groove perpendicular to the direction of the winding mandrel, one end of the second connecting member being slidably provided in the slide groove and the other end being embedded in the first through hole.

11. Cell production equipment, comprising a winding machine and at least one electrode plate wrinkling detection apparatus according to claim 1.

* * * * *